United States Patent
Oldham et al.

(10) Patent No.: US 8,285,506 B2
(45) Date of Patent: Oct. 9, 2012

(54) FUEL DISPENSER PULSER ARRANGEMENT

(75) Inventors: Christopher Adam Oldham, High Point, NC (US); Christopher Eric Scott, High Point, NC (US); Juergen Voss, Borchen (DE)

(73) Assignee: Gilbarco Inc., Greensboro, NC (US)

( * ) Notice: Subject to any disclaimer, the term of this patent is extended or adjusted under 35 U.S.C. 154(b) by 346 days.

(21) Appl. No.: 12/698,441

(22) Filed: Feb. 2, 2010

(65) Prior Publication Data
US 2011/0191037 A1     Aug. 4, 2011

(51) Int. Cl.
*G01F 25/00*     (2006.01)
*G06F 19/00*     (2011.01)

(52) U.S. Cl. .............. 702/85; 702/45; 702/46; 702/50; 702/55; 702/100; 222/71; 222/23; 700/240

(58) Field of Classification Search ............ 702/85, 702/45, 46, 50, 55, 100
See application file for complete search history.

(56) References Cited

U.S. PATENT DOCUMENTS

| | | | |
|---|---|---|---|
| 4,100,400 A | 7/1978 | Callahan et al. | |
| 4,122,524 A | 10/1978 | McCrory et al. | |
| 4,247,899 A | 1/1981 | Schiller et al. | |
| 4,637,525 A | 1/1987 | Miura et al. | |
| 4,728,788 A | 3/1988 | Myers et al. | |
| 4,876,653 A | 10/1989 | McSpadden et al. | |
| 5,016,187 A | 5/1991 | Forkert et al. | |
| 5,125,533 A | 6/1992 | Gayer et al. | |
| 5,208,742 A | 5/1993 | Warn | |
| 5,361,216 A | 11/1994 | Warn et al. | |
| 5,506,570 A | 4/1996 | Scott et al. | |
| 5,557,084 A | 9/1996 | Myers et al. | |
| 5,602,745 A | 2/1997 | Atchley et al. | |
| 5,831,861 A | 11/1998 | Warn et al. | |
| 5,923,572 A | 7/1999 | Pollock | |
| 6,067,476 A | 5/2000 | Siler | |
| 6,092,410 A | 7/2000 | Kaehler et al. | |
| 6,109,477 A | 8/2000 | Myers et al. | |
| 6,119,110 A | 9/2000 | Carapelli | |
| 6,302,129 B1 | 10/2001 | Van Dewerker | |
| 6,311,739 B1 * | 11/2001 | Thompson et al. ............ | 141/94 |
| 6,360,138 B1 | 3/2002 | Coppola et al. | |
| 6,463,389 B1 | 10/2002 | Dickson | |
| 6,499,516 B2 | 12/2002 | Pope et al. | |
| 6,697,705 B2 | 2/2004 | Johnson et al. | |
| 6,721,669 B2 * | 4/2004 | Kopl et al. ...................... | 702/55 |
| 6,882,941 B2 | 4/2005 | Nanaji et al. | |
| 6,935,191 B2 | 8/2005 | Olivier et al. | |
| 6,996,485 B2 | 2/2006 | Payne | |

(Continued)

*Primary Examiner* — Hal Wachsman
(74) *Attorney, Agent, or Firm* — Nelson, Mullins, Riley & Scarborough LLP

(57) ABSTRACT

An apparatus for generating a measure of fluid. The apparatus comprises a flow meter and a pulser having an identifier and a memory. The pulser is associated with the flow meter for generating pulser data indicative of a volume of fluid delivered through the flow meter. The pulser may alter the pulser data using correction data stored in its memory to generate altered pulser data. The pulser may store at least one of the pulser data and the altered pulser data in the memory. The apparatus further comprises a switch operatively connected to the pulser's memory. The switch is operative to vary the memory of the pulser between a write-protected and a write-enabled mode. Also, the apparatus comprises a controller in communication with the pulser and a serial communication circuit which enables communication between the pulser and the controller. Communication between the controller and the pulser includes the identifier.

29 Claims, 8 Drawing Sheets

| | NONVOLATILE PULSER MEMORY 36 | | | |
|---|---|---|---|---|
| PULSER DATA | GENERATED AT MANUFACTURE | WRITTEN BY CONTROLLER 16 | READ BY CONTROLLER 16 | WRITTEN BY PROCESSOR 38 |
| 70 — SOFTWARE | ▪ | | | |
| 72 — SERIAL NUMBER | ▪ | | ▪ | |
| 74 — COMMUNICATIONS ID | | ▪ | ▪ | |
| 76 — ENCRYPTION ALGORITHMS | | ▪ | | |
| 78 — CALIBRATION FACTOR | ▪ | ▪ | | |
| 80 — VOLUME CORRECTION FACTOR (VCF) | ▪ | ▪ | | |
| 82 — RAW PULSE DATA | | | ▪ | ▪ |
| 84 — CORRECTED PULSE DATA | | | ▪ | ▪ |
| 86 — CORRECTED VOLUME | | | ▪ | ▪ |
| 88 — TEMPERATURE DATA | | | ▪ | ▪ |
| 90 — AVERAGE TEMPERATURE DATA | | | ▪ | ▪ |
| 92 — CORRECTED, COMPENSATED DATA | | | ▪ | ▪ |
| 94 — CORRECTED, COMPENSATED VOLUME | | | ▪ | ▪ |

U.S. PATENT DOCUMENTS

| | | |
|---|---|---|
| 7,028,561 B2 | 4/2006 | Robertson et al. |
| 7,076,330 B1 * | 7/2006 | Dickson .................. 700/244 |
| 2003/0065422 A1 | 4/2003 | Johnson et al. |
| 2004/0088122 A1 | 5/2004 | Nanaji et al. |
| 2005/0147250 A1 | 7/2005 | Tang |
| 2005/0262027 A1 | 11/2005 | Hutchinson et al. |
| 2006/0265736 A1 | 11/2006 | Robertson et al. |
| 2007/0129905 A1 | 6/2007 | Larsson et al. |
| 2008/0103980 A1 | 5/2008 | Finley et al. |
| 2008/0110981 A1 | 5/2008 | DeLine et al. |
| 2008/0120191 A1 | 5/2008 | Long |
| 2008/0290152 A1 | 11/2008 | Lundgren et al. |
| 2009/0058641 A1 | 3/2009 | DeMarco |
| 2010/0262385 A1 | 10/2010 | Chen et al. |

* cited by examiner

| PULSER DATA | NONVOLATILE PULSER MEMORY 36 ||||
|---|---|---|---|---|
| | GENERATED AT MANUFACTURE | WRITTEN BY CONTROLLER 16 | READ BY CONTROLLER 16 | WRITTEN BY PROCESSOR 38 |
| 70 — SOFTWARE | ■ | | | |
| 72 — SERIAL NUMBER | ■ | | | |
| 74 — COMMUNICATIONS ID | | ■ | ■ | |
| 76 — ENCRYPTION ALGORITHMS | | ■ | ■ | |
| 78 — CALIBRATION FACTOR | ■ | | | |
| 80 — VOLUME CORRECTION FACTOR (VCF) | ■ | | | |
| 82 — RAW PULSE DATA | | | ■ | ■ |
| 84 — CORRECTED PULSE DATA | | | ■ | ■ |
| 86 — CORRECTED VOLUME | | | ■ | ■ |
| 88 — TEMPERATURE DATA | | | ■ | ■ |
| 90 — AVERAGE TEMPERATURE DATA | | | ■ | ■ |
| 92 — CORRECTED, COMPENSATED DATA | | | ■ | ■ |
| 94 — CORRECTED, COMPENSATED VOLUME | | | | ■ |

FIG. 5

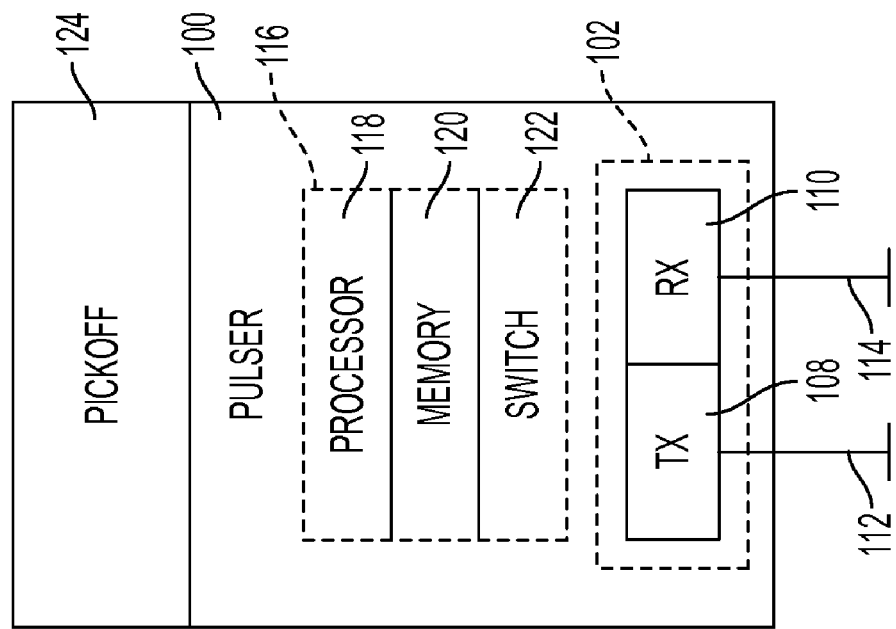
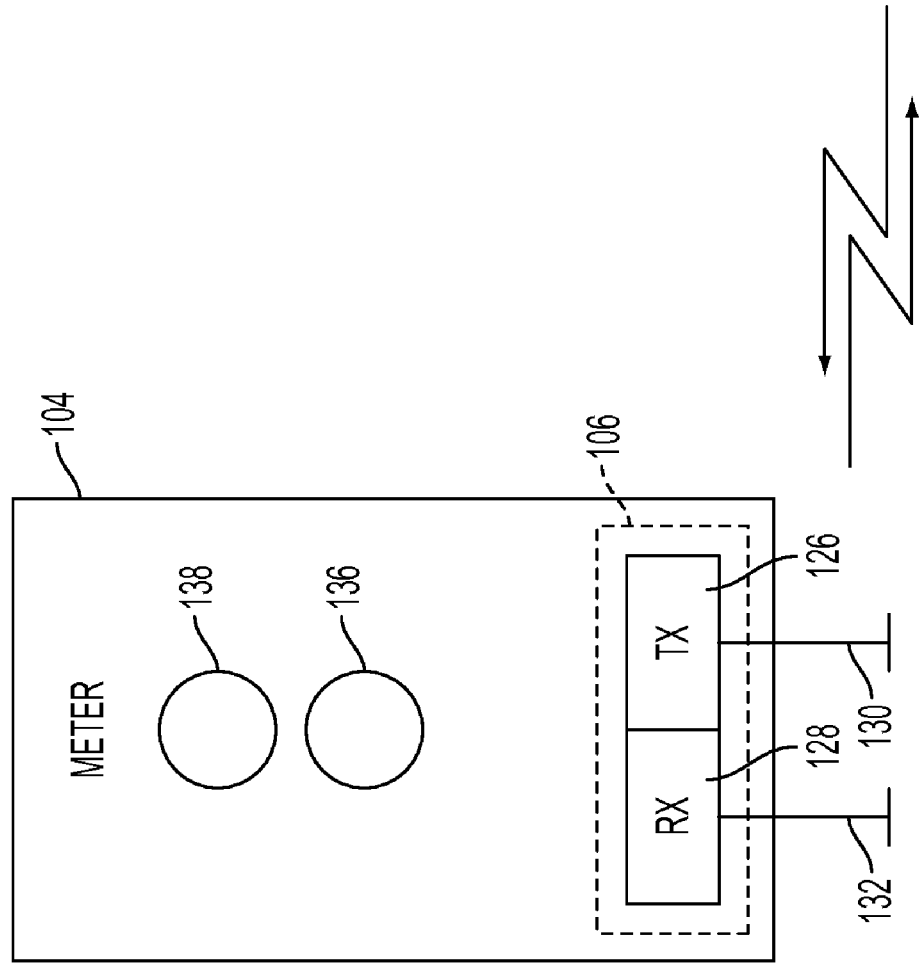
FIG. 7

FUEL DISPENSER PULSER ARRANGEMENT

FIELD OF THE INVENTION

The present invention relates generally to the measurement of fuel delivered to a customer using a fuel dispenser. More particularly, the invention relates to an improved pulser arrangement for use in a fuel dispenser.

BACKGROUND OF THE INVENTION

As is well known, flow meters are used to perform flow rate measurements. For example, fuel dispensers in retail service station environments include flow meters that measure volumetric flow rate of the fuel as it is dispensed. Such flow meters are typically required to comply with weights and measures regulatory requirements that mandate a high level of accuracy. This ensures that the customer is neither overcharged nor undercharged for the fuel purchase. Typically, either positive displacement meters or inferential meters have been used for this purpose.

Modern service station fuel dispensers monitor the amount of fuel delivered to a customer's vehicle by counting the number of pulses generated by a pulser. Pulsers are electromechanical devices operatively connected to the flow meter which generate a pulse train as the fuel is dispensed. Each pulse represents a known volume of fuel passing through the meter. Attempts have been made to interfere with or alter the signal emitted by the pulser in order to modify the calculated volume of fuel dispensed. For example, a dishonest consumer may desire to report a lower fuel volume in order to steal a portion of the fuel.

Many older pulsers use general purpose input/output (I/O) for communication. However, serial pulsers are also known. Serial pulsers are connected to a serial communications port on a controller board or the like of the dispenser. Such pulsers typically have a processor that communicates pulse data to the dispenser controller via a protocol.

For a variety of reasons, fuel volume or flow rate measurement technologies have limited accuracy. For example, various mechanical components of a flow meter may undergo wear during the life of the meter. This wear, also known as meter drift, introduces an error from a meter's initial calibration state. Typically, flow meters also have limited accuracy across a finite range of flow rates, such as at low flow rates. Therefore, flow meters often require periodic manual or electronic calibration. Also, some flow meters are electronically self-calibrating based on the amount of fuel dispensed over the service life of the meter.

As an example of electronic calibration, an authorized technician may toggle a switch located in the dispenser electronics compartment to place a fuel dispenser in a calibration mode. The technician then actuates the fuel dispenser and dispenses a quantity of fuel into a metered vessel. Next, the technician uses a keypad or the like to input the measured volume of dispensed fuel, and the keypad transmits that value to a dispenser controller. The controller includes electronics that communicate with the pulser to obtain the raw pulse data and calculate the purported volume of fuel dispensed. The controller then executes software that, based upon data received from the pulser and the measured volume entered on the keypad, calculates a calibration factor and stores that calibration factor in memory.

The calibration procedure may be performed over a range of flow rates to arrive at a calibration curve. Often, the dispenser controller will employ the meter calibration factor or calibration curve to alter or correct the pulse data obtained from a specific meter. Alternatively, or in addition, the volumetric data calculated from the raw pulse data may be revised to obtain the correct volume of fuel dispensed. Modern fuel dispensers may store both the raw pulse data and the total corrected and uncorrected volume data over the life of the pulser in one or more circuit boards in the dispenser electronics compartment.

Additionally, the volume of liquid fuel is somewhat dependent on temperature (i.e., it expands when heated and contracts when cooled). Various governmental bodies have from time to time required temperature effects to be taken into account. Prior art solutions provide temperature compensation by sending signals from thermometric probes located in a flow meter to a first circuit in the dispenser's lower fuel handling compartment, to a second circuit in the dispenser's upper electronics compartment via an intrinsically safe connection, and finally to a computation device designed to combine the temperature data and pulser data. The computation device employs a volume correction factor (VCF) to compensate the pulser data so as to account for temperature variations. Detailed information regarding temperature compensation of dispensed fuel is disclosed in U.S. Pat. No. 5,557,084 to Myers et al., entitled "Temperature Compensating Fuel Dispenser," the entire disclosure of which is incorporated herein by reference for all purposes.

SUMMARY OF THE INVENTION

According to one aspect, the present invention provides an apparatus for generating a measure of fluid. The apparatus comprises a flow meter and a pulser having an identifier and a memory. The pulser is associated with the flow meter for generating pulser data indicative of a volume of fluid delivered through the flow meter. The pulser is also adapted to alter the pulser data using correction data stored in its memory to generate altered pulser data. The pulser is further adapted to store at least one of the pulser data and the altered pulser data in the memory. The apparatus further comprises a switch operatively connected to the pulser's memory. The switch is operative to vary the memory of the pulser between a write-protected and a write-enabled mode. Also, the apparatus comprises a controller that is communicatively coupled to the pulser and a serial communication circuit which enables communication between the pulser and the controller. Communication between the controller and the pulser includes the identifier.

Another aspect of the present invention provides a method of initializing a pulser installed in a fuel dispenser using a fuel dispenser controller. The method comprises the steps of reading pulser identifying information from a memory of the pulser; storing the pulser identifying information in a memory of the fuel dispenser controller; writing communications information to the memory of the pulser; reading calibration information from the memory of the pulser; and writing the calibration information to the memory of the fuel dispenser controller. The fuel dispenser controller and the pulser may communicate over a serial communication circuit. Also, the pulser may comprise a switch operatively connected to the memory of the pulser, wherein the switch is operative to vary the memory of the pulser between a write-protected and a write-enabled mode.

In accordance with a further aspect, the present invention provides a fuel dispenser comprising a flow meter and a pulser associated with the flow meter for generating a pulse series indicative of a volume of fuel delivered through the flow meter. The pulser has an identifier stored in a nonvolatile memory, and a switch operatively connected to the nonvolatile memory. The switch is operative to vary the nonvolatile memory of the pulser between a write-protected and a write-enabled mode. The fuel dispenser further comprises a control system for controlling the fuel dispenser. The control system has a control system memory and is adapted to read from and write to the pulser nonvolatile memory. Also, the fuel dispenser comprises a communication circuit to enable communication between the control system and the pulser. The serial communication between the control system and the pulser can either be encrypted or unencrypted. Finally, at least one of the pulser and the control system is adapted to alter the pulse series using calibration data stored in either the pulser nonvolatile memory or the control system memory.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 5 is a table summarizing various types of data that may be written to or provided in a pulser's nonvolatile memory according to an embodiment of the present invention.

FIG. 7 is a schematic diagram of a pulser comprising transponder electronics and a flow meter comprising interrogator electronics according to an embodiment of the present invention.

Figure 1:
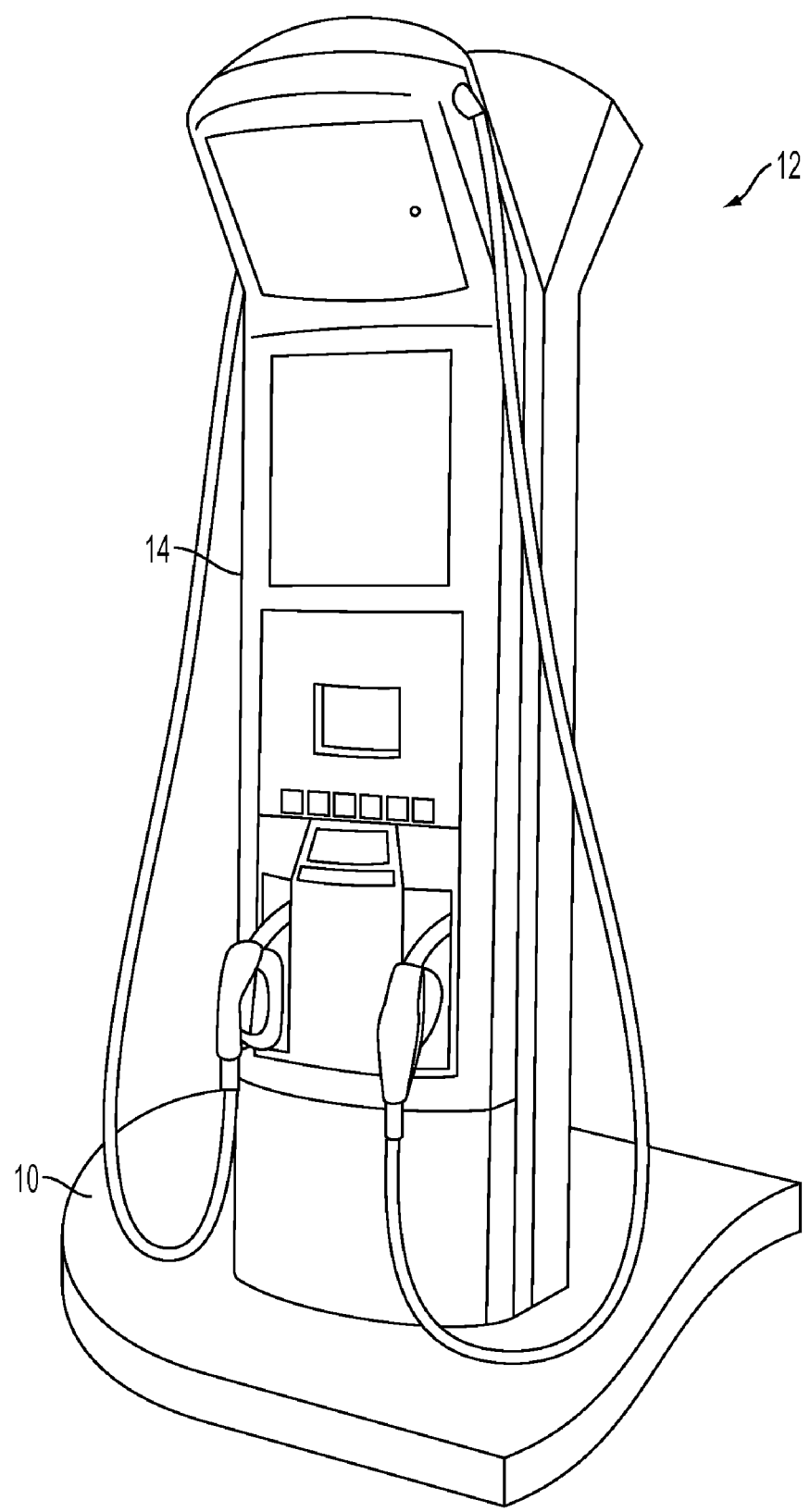
FIG. 1 illustrates an exemplary fuel dispenser that may incorporate a pulser in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to FIG. 1, in a fueling environment one or more fueling islands 10 may have one or more fuel dispensers 12 positioned thereon. The fuel dispensers 12 are typically in electronic communication with a site controller (not shown) through a LAN or the like. The site controller, which in an exemplary embodiment may be part of the PASSPORT® point of sale (POS) system sold by Gilbarco Inc. of Greensboro, N.C., may control the authorization of fueling transactions and other conventional activities. The fuel dispensers 12 each comprise a housing 14 that defines a fuel handling compartment and an electronics compartment. Customers purchase fuel using fuel dispenser 12 in a well-understood manner. Further information on how elements of a fueling environment may interact is described in U.S. Pat. No. 5,956,259 to Hartsell et al., entitled "Intelligent Fueling," the entire disclosure of which is incorporated herein by reference for all purposes.

Figure 2:
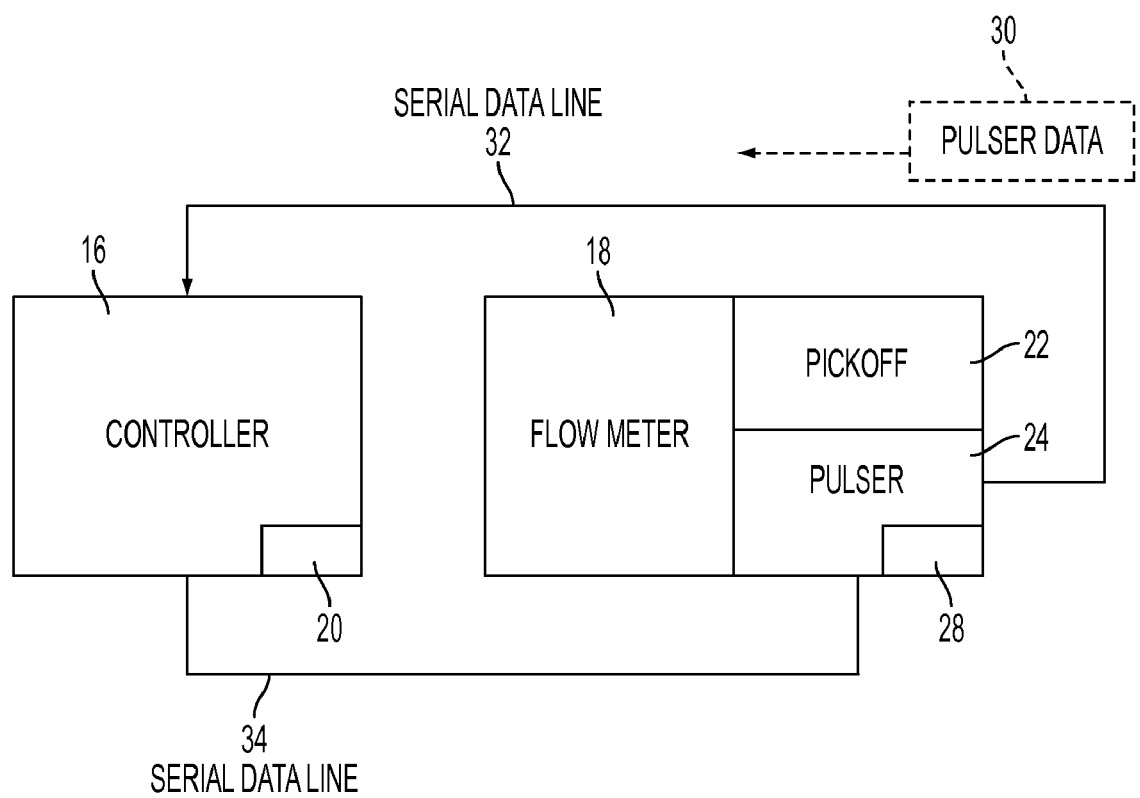
FIG. 2 is a schematic diagram of various internal components of a fuel dispenser in accordance with an embodiment of the present invention.

FIG. 2 shows some internal components of a fuel dispenser in accordance with an embodiment of the present invention. As shown, the fuel dispenser may comprise a dispenser controller 16 communicatively coupled to a flow meter 18. Controller 16 may be a microprocessor, microcontroller, or other electronics with associated memory 20 and software programs running thereon. Controller 16 typically controls other aspects of the fuel dispenser 12, such as valves, displays, and the like as is well understood. Flow meter 18 can be a positive displacement meter, an inferential meter, or other suitable flow meter. Flow meter 18 may comprise, as part of its constituent elements, a magnetic pickoff 22 and a serial pulser 24.

During operation, pulser 24 cooperates with pickoff 22 and meter 18 to generate a series of pulses indicative of the liquid volume flowing through meter 18. In some embodiments, for example, each pulse may represent 1/1000 gallons of fuel. Those of skill in the art are aware that while one pulse series is sufficient to determine volumetric flow rate, two pulse series are commonly used to indicate a pulser failure or pulser rotational direction. Pulser electronics 28 may electronically adjust the pulse series to account for measurement errors in one or more ways as described below. Pulser data 30 is periodically transmitted by pulser electronics 28 to controller 16 via serial data line 32. In addition, controller 16 is adapted to operatively communicate with pulser electronics 28 via serial data line 34. Although two serial data lines are shown in FIG. 2 for purposes of explanation, those of skill in the art will appreciate that only one serial data line may be used for communications between controller 16 and pulser 24. Communications between controller 16 and pulser 24 are preferably encrypted.

Figure 3:
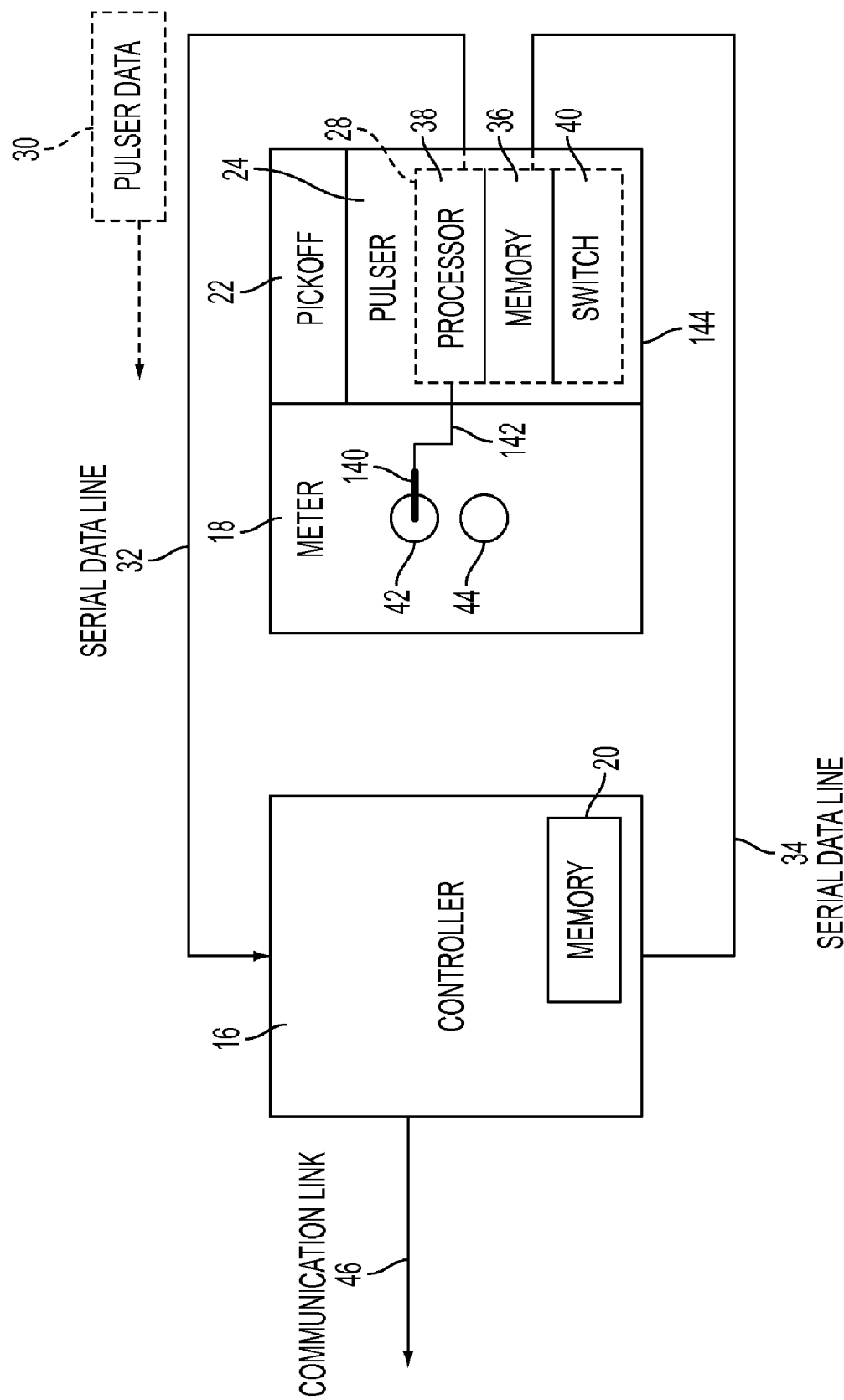
FIG. 3 is a detailed schematic diagram illustrating the functional relationship between the dispenser controller and the pulser according to one embodiment of the present invention.

FIG. 3 illustrates in more detail the relationship between controller 16 and components of pulser 24 according to one embodiment of the present invention. Specifically, pulser electronics 28 comprises nonvolatile memory 36 in electronic communication with processor 38 and switch 40. In this case, memory 36 communicates with controller 16 via serial data line 34. In addition, processor 38, which may be a microcontroller, microprocessor, or the like, is adapted to communicate with controller 16 via serial data line 32. It should be understood that processor 38 may preferably include an operating program permanently stored in a ROM, and may also store information temporarily in a random access memory (RAM) on an as-needed basis. Processor 38 may typically employ a variety of conventional items such as counters, registers, flags, and indexes as necessary or desired.

As noted above, pulser 24 also comprises a switch 40 operative to protect nonvolatile memory 36 from being written to based on the switch's position. Switch 40 may be a DIP switch, a jumper, or any other suitable device or method capable of switching between two positions. The position of the switch 40 determines whether or not the controller 16 (or other devices in the fueling environment if desired) may write information to the pulser's memory 36 via serial data line 34. In other words, setting the switch 40 to the OFF position creates a "write-protected" mode. However, controller 16 may read from memory 36 regardless of the position of the switch 40. It will be clear to those skilled in the art that because switch 40 is located proximal to meter 18 and pulser 24, rather than in the fuel dispenser 12's upper electronics compartment, authorized technicians servicing a meter will have easy access to switch 40.

In another aspect, meter 18 may also comprise a plurality of ports or "wells" (such as wells 42 and 44) mounted in an endwall of its housing for receipt of temperature probes. In accordance with the present invention, pulser 24 may be in electrical communication with these probes to perform automatic temperature compensation (ATC) functions. Each probe preferably uses a highly-accurate, almost linear resistance temperature detector (RTD) and four wire method of measurement. Temperature probes suitable for this aspect of the present invention are available from Gilbarco Inc. of Greensboro, N.C., although similar probes known to those of skill in the art may also be used.

In a further aspect, fuel dispenser 12 may comprise a communication link 46 adapted to provide communication between dispenser controller 16 and a site controller or the like. Communication link 46 may be an Ethernet cable or the like or could be wireless if needed or desired. By way of communication link 46, controller 16 may communicate any of the data input thereto on to the site controller, which may use any of this information for reporting or decision purposes. For example, the site controller may communicate with a remote location for credit/debit card authorization or it may communicate information to the remote location for logging, tracking, or problem identification.

Those of skill in the art are aware that fuel dispensers are designed in a variety of different configurations and may have a plurality of flow meters respectively associated with a plurality of pulsers. Thus, multiple arrangements for communication of data from the plurality of pulsers to a dispenser controller are possible. A common type of fuel dispenser, often called a "lane oriented" dispenser, has one or more fuel dispensing nozzles on each of two sides of the unit. In the case of multiple nozzles on a side, each of the nozzles may be used to dispense a particular grade (e.g., octane level) of fuel. Alternatively, a single nozzle may be provided for dispensing multiple grades of fuel depending on the customer's selection.

Also, different types of fuels may be dispensed using one or more flow meters. For example, each side of a fuel dispenser may have one flow meter for dispensing higher octane fuel and one flow meter for dispensing lower octane fuel. Such a dispenser would also have a pulser associated with each meter on each side to communicate with a single controller in the dispenser electronics cabinet. Only the high and low grades of gasoline are supplied to the dispenser, but if the dispenser is a blending fuel dispenser, it may also blend the two grades to provide intermediate grades of fuel. Specifically, if a customer selects an intermediate octane fuel, fuel flows through both flow meters. Pulsers associated with each of the two meters communicate with the controller to determine the amount of fuel flowing through the meters. Then, as both higher octane and lower octane fuels pass through their respective meters, the fuels come together in a blend manifold to be delivered through a hose and nozzle into a customer's vehicle.

Figure 4A:
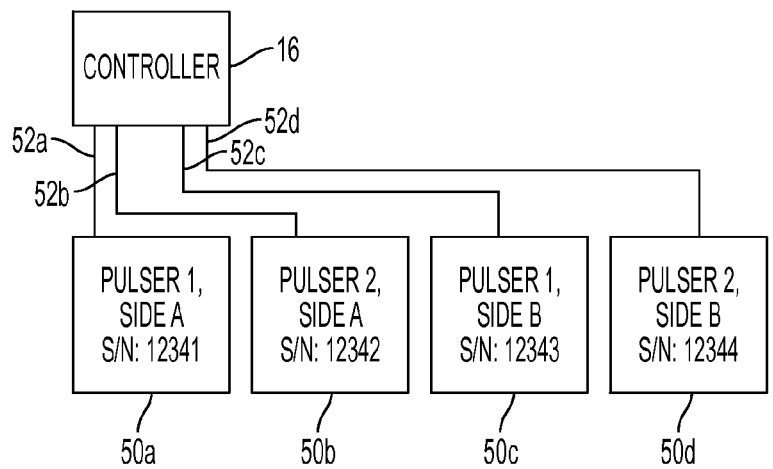
FIGS. 4A-4C are schematic diagrams illustrating the configuration of the controller and multiple pulsers associated with a fuel dispenser according to various embodiments of the present invention.
Figure 4B:
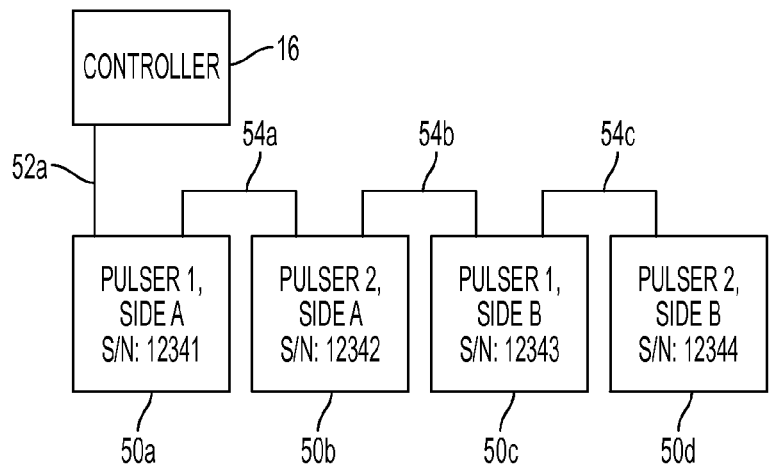
Figure 4C:
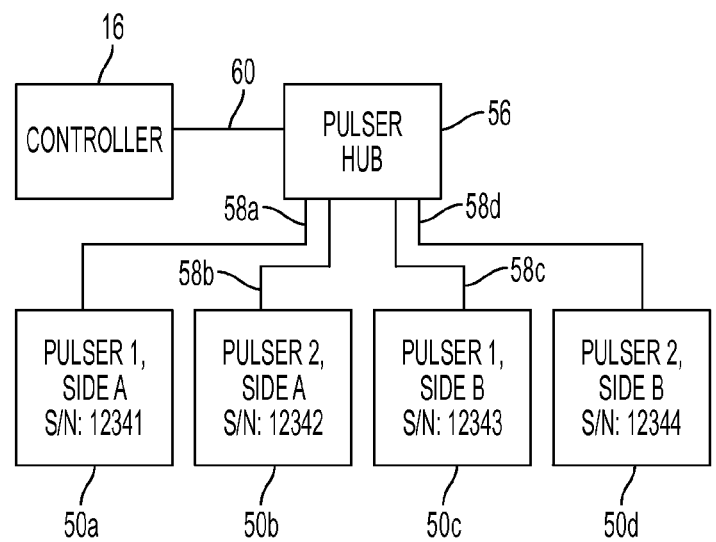

In this regard, FIGS. 4A-4C provide several alternative arrangements for communication between controller 16 and one or more pulsers. The fuel dispenser in the illustrated examples is a lane-oriented multiproduct fuel dispenser having two sides, Side A and Side B. Also, the dispenser in these examples has four flow meters and four pulsers, two on each side.

For example, FIG. 4A shows controller 16 and multiple pulsers (50a-50d) associated with a fuel dispenser according to one embodiment of the present invention. Pulsers 50a-50d are illustrated as "Pulser 1, Side A," "Pulser 2, Side A," etc., to illustrate their orientation on each side. Also, each pulser 50a-50d is shown having a unique identifier in the form of a serial number that may be assigned at the time of manufacture. In the illustrated example, each pulser 50a-50d is in direct electronic communication with controller 16 via respective serial data lines 52a-52d.

In FIG. 4B, pulsers 50a-50d are "daisy-chained" together via serial data lines 54a-c. Also, pulser 50a is in direct electronic communication with controller 16 via serial data line 52a. Pulser 50a includes suitable multiplexer electronics to forward serial data communications from each of pulsers 50b-50d to controller 16 via serial data line 52a.

In FIG. 4C, pulsers 50a-50d are each in direct electronic communication with pulser hub 56 via respective serial data lines 58a-58d. Pulser hub 56 acts as an electronic intermediary to facilitate communication between one or more of pulsers 50a-50d and controller 16 via serial data line 60. Further, persons of skill in the art will appreciate that other configurations within the scope of the present invention are possible.

Referring again to FIG. 3, various data 30 associated with the pulser's operation is either continuously or periodically written to nonvolatile memory 36 so that the data is preserved during electrical power loss. Desirable nonvolatile memory types include electronically programmable read only memory (EPROM), electronically erasable programmable read only memory (EEPROM), ferro-electric nonvolatile memory devices, flash memory devices, and other suitable types of alterable nonvolatile memory. The practice of the present invention contemplates using any suitable memory device as necessary or desired.

Moreover, many configurations of data storage are possible. Using the example of the pulse series generated during a fueling transaction as fuel flows through meter 18, processor 38 may comprise a counter that keeps track of and stores the number of pulses generated during the individual fueling transaction. Additionally, processor 38 may keep track of and store the number of pulses generated during a predetermined time period, such as a work shift or a 24-hour period. Processor 38 may also store the pulses as a running total over the life of the pulser such that the value of stored pulse data will increase steadily over time. It should be understood that the practice of the present invention contemplates processor 38 using these and other methods and configurations of data storage.

In this regard, FIG. 5 provides a table summarizing various types of pulser data 30 that may be written to or provided in nonvolatile memory 36 of pulser 24 according to some embodiments of the present invention. First, during manufacture, pulser 24 may be provided with data comprising software 70 and a serial number 72 that is stored in nonvolatile memory 36. Software 70 is designed to implement the various functions of pulser 24, such as communications, calibration, temperature compensation, encryption and decryption, and volume computation. Those of skill in the art will be able to implement suitable software in accordance with this invention.

Additionally, serial number 72 may be a unique identifier assigned upon manufacture that is used in communications with controller 16 to identify pulser 24. Serial number 72 is stored in pulser memory 36, which is preferably nonvolatile memory to prevent data loss when power is removed. Similarly, flow meter 18 may be assigned a unique serial number that is stored in pulser memory 36. For more information on fraud prevention by providing unique identifiers in dispenser components, see commonly owned U.S. Pat. No. 6,882,941 to Nanaji et al., entitled "Tamper Proof Meter," the entire disclosure of which is incorporated herein in its entirety for all purposes.

Figure 6A:
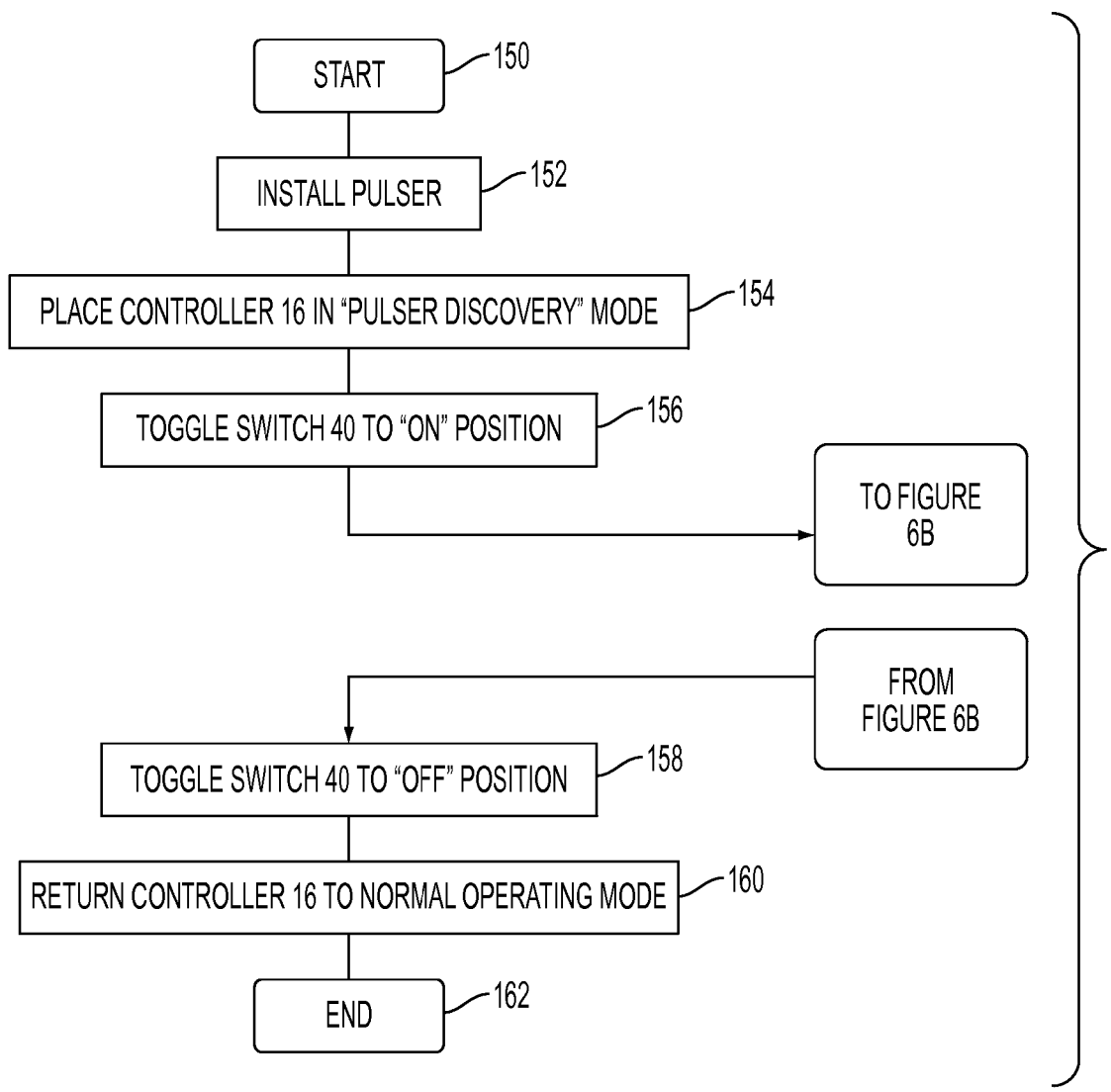
FIG. 6A is a flowchart outlining the installation of the pulser into a fuel dispenser according to an embodiment of the present invention.

One preferred methodology of installing pulser 24 into fuel dispenser 12 will now be described in reference to FIGS. 6A and 6B. First, the installation process starts (step 150) and an authorized technician installs serial pulser 24 (step 152). Then, the technician places the controller 16 in "pulser discovery" mode (step 154). The technician toggles switch 40 to the ON position (step 156) so that controller 16 is allowed to write to memory 36 of pulser 24. As described in more detail below in reference to FIG. 6B, in this mode controller 16 performs a process to initialize pulser 24. After the initialization process is complete, the technician will toggle switch 40 to the OFF position (step 158). The technician then returns controller 16 to its normal operating mode (step 160) and the installation process ends (step 162).

Figure 6B:
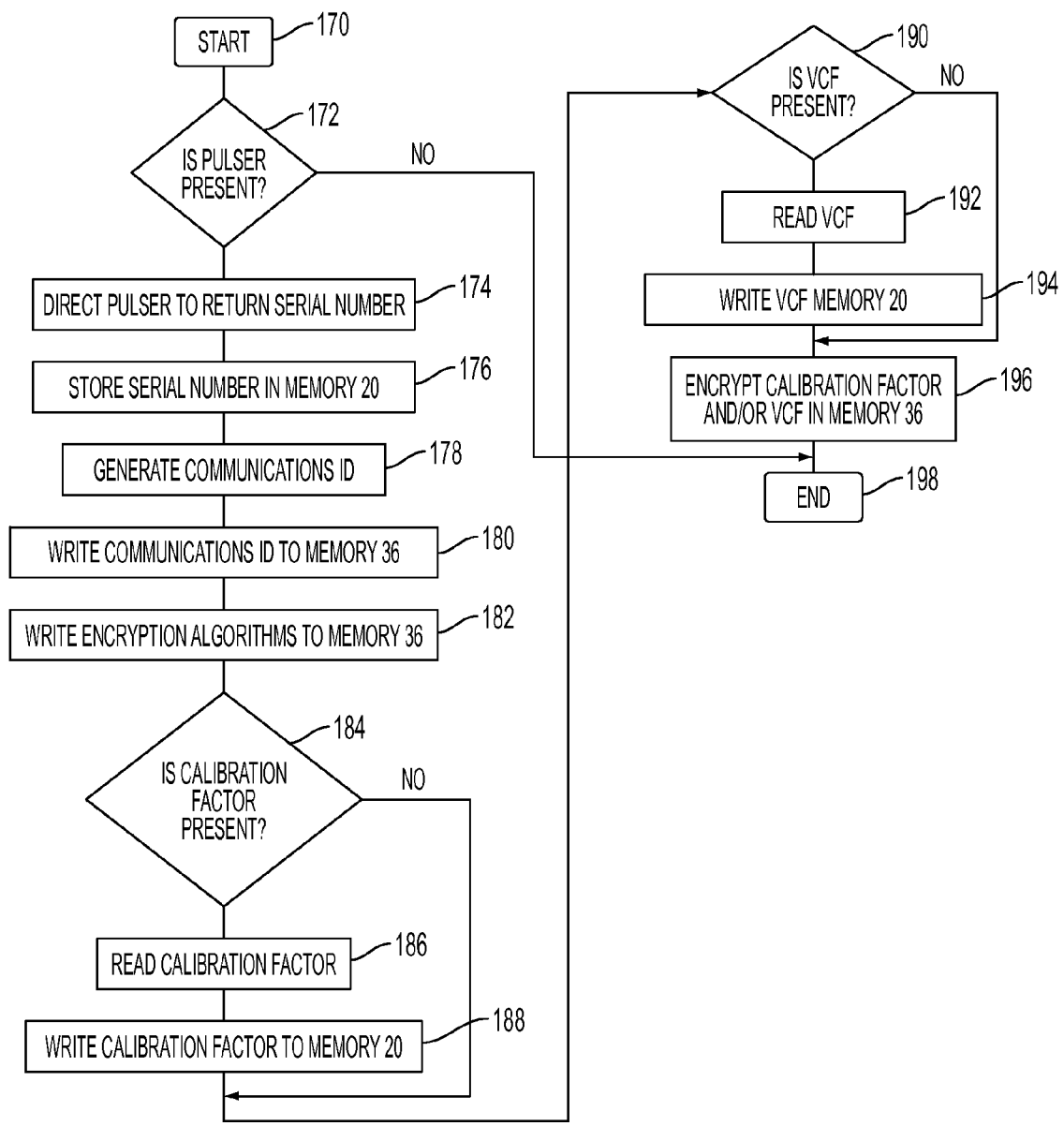
FIG. 6B is a flowchart outlining the steps performed by a fuel dispenser controller to initialize a serial pulser in accordance with an embodiment of the present invention.

Referring now to FIG. 6B, in pulser discovery mode controller 16 communicates with the newly-installed pulser 24 to associate the pulser with flow meter 18 and dispenser 12. At this point, the pulser 24 is not able to encrypt and decrypt communications to and from controller 16, so communications are in clear text format. More specifically, the process starts (step 170) and controller 16 determines whether a pulser has been installed (step 172). If controller 16 detects the presence of pulser 24, controller 16 transmits a command to pulser 24 directing pulser 24 to return its previously stored serial number 72 to controller 16 (step 174). Controller 16 then stores serial number 72 in memory 20 to facilitate secure communications (step 176).

Preferably, every communication between the controller 16 and the pulser 24 is encrypted except for communications sent during the pulser discovery mode described above. In this regard, after controller 16 has stored serial number 72 sent from pulser 24, controller 16 generates a communications identifier (ID) 74 (step 178) that is used in every subsequent communication between controller 16 and pulser 24. Although embodiments are contemplated in which the serial number 72 is used as communications ID 74, it is preferred that controller 16 derive communications ID 74 from unique serial number 72 such that communications ID 74 is also unique. Then, controller 16 writes communications ID 74 to memory 36 of pulser 24 (step 180) so that pulser 24 can communicate with controller 16.

While switch 40 is still in the ON position, controller 16 also writes encryption algorithms 76 to memory 36 of pulser 24 (step 182). In one aspect of the present invention, encryption algorithms 76 allow the processor 38 of pulser 24 to encrypt any or all of the data carried in signals sent to controller 16 and decrypt encrypted data carried in signals sent from controller 16. Further, encryption algorithms 76 may be adapted to decrypt data that is stored in memory 36 in an encrypted format. In another embodiment, a configuration setting allows the authorized technician to determine whether the communication between controller 16 and pulser 24 should be encrypted. In yet another embodiment, the encryption algorithms 76 may incorporate the unique serial number 72 in encrypting and decrypting data 30.

Suitable encryption algorithms are known in the art and encryption algorithms 76 may comprise a fully encrypted protocol using master/session, derived unique key per transaction (DUKPT), or any other suitable encryption method. For example, the encryption protocol may be similar to that disclosed in U.S. Pat. No. 6,119,110 to Carapelli, entitled "Measuring Device, Particularly for Fuel Pumps," which is incorporated by reference herein in its entirety for all purposes.

Next, as noted above, although flow meters are calibrated at manufacture, they are subject to mechanical wear, nonlinearities at certain flow rates and other characteristics that cause a loss of metering accuracy over their service life. Thus, flow meters require periodic calibration. Also, the accuracy of the fuel measurement may vary with changes in fuel temperature. Moreover, components performing ATC functions may drift with time and temperature, causing associated drifts in temperature readings. Therefore, these components may also require periodic calibration. Furthermore, regulatory bodies may require periodic inspections of meter correction and temperature compensation components (e.g., annually) to verify their accuracy.

Thus, pulser 24 is preferably adapted to perform two functions—correction of meter error and temperature compensation—that electronically alter a series of pulses indicative of the flow rate of fuel through meter 18. Correction of meter error broadly includes correction of meter drift, rectification of nonlinearities at specific flow rates, and adjustment of other characteristics which cause flow meter inaccuracy. Temperature compensation refers to correction of pulse data to account for variations in fuel temperature that may cause a pulse series to incorrectly indicate the volume dispensed. Further, pulser 24 is preferably operative to perform these functions in any order after receiving a "raw" pulse series to generate a signal representative of the actual volume of fuel dispensed.

At manufacture, flow meter 18 may be calibrated and a calibration factor 78 may be stored in pulser memory 36. Further, if the dispenser is intended to compensate automatically for fuel temperature differences, a volume correction factor (VCF) 80 may also be stored in pulser memory 36. During installation of the pulser 24 into fuel dispenser 12, controller 16 first determines whether a calibration factor has been installed in pulser 24 (step 184). If so, controller 16 reads the calibration factor 78 from memory 36 (step 186) and stores it in memory 20 (step 188). Likewise, controller 16 then determines whether a VCF has been installed in pulser 24 (step 190). If so, controller reads VCF 80 from memory 36 (step 192) and stores it in memory 20 (step 194). Controller 16 may also at this point encrypt the calibration factor 78 and VCF 80 in memory 36 to enhance security (step 196). Once the process ends (step 198), either pulser 24 or controller 16 or both may use calibration factor 78 and VCF 80 to electronically alter a pulse series to account for measurement errors.

Additionally, either or both of the calibration factor 78 and VCF 80 may be updated during a periodic (e.g., annual) calibration in the field by authorized service technicians. In this case, a service technician places the dispenser 12 in calibration mode and toggles switch 40 to the ON position such that controller 16 may write to memory 36 of pulser 24. After performing the calibration procedure such that controller 16 has stored the new calibration factor 78 and VCF 80 in memory 20 of controller 16 and memory 36 of pulser 24, the service technician toggles switch 40 to the OFF position to return the pulser memory 36 to a "read-only" mode.

It may be desirable to store calibration and compensation data in an encrypted format to further discourage tampering. For example, during a field calibration process, both calibration factor 78 and VCF 80 may be written by controller 16 to memory 36 in encrypted format. Thus, these data, which are believed to be of a sensitive nature, would be both transmitted in an encrypted signal and stored in an encrypted format to provide additional security.

As noted above, as fuel flows through meter 18 during a fueling transaction, pickoff 22 and pulser 24 cooperate to generate a series of pulses indicative of the liquid volume flowing through meter 18. This series of pulses, or raw pulse data 82, may be electronically altered by processor 38 to compensate for measurement errors, nonlinearities at specific flow rates, temperature variations, or the like. Further, processor 38 preferably stores raw pulse data 82 in memory 36.

Generally, at a given flow rate, processor 38 observes the number of pulses delivered in the raw pulse data 82 and, using calibration factor 78, effectively adds or subtracts a selected number of pulses to generate corrected pulse data 84. Detailed information regarding use of meter calibration factors in a fuel dispenser is provided in commonly owned U.S. Pat. No. 6,721,669 to Kopl et al., entitled "Method and Device for Measuring the Volumetric Flow of a Fluid," the entire disclosure of which is incorporated herein by reference for all purposes. Processor 38 may also store corrected pulse data 84 in memory 36. As used herein, corrected pulse data 84 is representative of a pulse series associated with a meter having little or no measurement error due to meter drift but does not include compensation for fuel temperature.

In an alternative embodiment, processor 38 transmits raw pulse data 82 over serial data line 32 to controller 16 such that controller 16 uses calibration factor 78, which can be stored in memory 20, to generate corrected pulse data 84. In yet another embodiment, both processor 38 and controller 16 generate corrected pulse data 84. Controller 16 may then compare the corrected data it generates with the corrected data sent by processor 38 to verify that the pulser 24 has not been tampered with, thus adding a further layer of security.

Next, because each pulse represents a known volume, processor 38 may use the corrected pulse data 84 to determine the corrected volume 86 of fluid dispensed by summing the individual pulses in the pulse series of corrected pulse data 84. Processor 38 may store the corrected volume 86 in memory 36. Next, processor 38 transmits a signal carrying the corrected volume 86 to controller 16, which determines the amount due for the fuel purchase. The volume and amount due are provided to a display for the customer. Alternatively, controller 16 may calculate corrected volume 86 based on a signal sent from processor 38 carrying corrected pulse data 84.

The storage of raw pulse data 82, corrected pulse data 84, and corrected volume 86 may be required by regulatory bodies and may further be useful for inventory, tracking, and/or calibration purposes. Although prior art dispensers stored some of this information on a plurality of circuit boards located in the electronics compartment, it can be seen that the present invention eliminates the need for multiple circuit boards by storing the information in memory 36 of pulser 24.

In one embodiment of the present invention, processor 38 of pulser 24 may be adapted to generate a temperature compensated pulse series to account for variations in fuel temperature. As noted above, prior art fuel dispensers designed to provide automatic temperature compensation located the electronics controlling the temperature compensation logic above a vapor barrier in the electronics compartment of the dispenser housing. Signals from temperature probes in the dispenser's flow meters would pass from an intrinsically safe board in the fuel handling compartment designed to combine the signals into serial pulsewidth modulated form through an intrinsically safe passage to the temperature compensation electronics. The temperature compensation electronics then use the temperature data and a VCF to compensate the raw pulse data.

Referring now also to FIG. 3, in one embodiment of the present invention, pulser 24 is provided in an intrinsically safe housing. A first temperature probe 140 is permanently secured in well 42 to be directly exposed to the fuel as it flows through the meter 18 to obtain a direct measurement of the temperature of the fuel. Test well 44, which may be filled with a thermally conductive material to assure a good thermal connection, is provided as a receptacle for a testing authority's thermometer to test the accuracy of the first probe. As indicated at 142, the first temperature probe is preferably in electrical communication with the pulser electronics 28.

Processor 38 of pulser 24 regularly scans first temperature probe 140 to convert voltage measurements to time-domain pulsewidth temperature data 88. Also, processor 38 may compensate for error of the probes (e.g., from nonlinearity of the resistance of the probes or from equipment drift) in a known fashion by use of a lookup table of values of resistance for temperatures in the expected temperature range and linear interpolation. Those skilled in the art will understand that a fuel dispenser may comprise a plurality of temperature probes at various points along the fuel distribution piping for measurements of both fuel and ambient temperature.

Preferably, processor 38 will store temperature data 88 in memory 36. Furthermore, such as if necessary to meet regulatory requirements of some governmental bodies in various world markets, the processor 38 may average the temperature data over one or more time periods and store average temperature data 90 in nonvolatile memory 36. Processor 38 then preferably uses the temperature data 88 obtained from first temperature probe 140 to compensate corrected pulse data 84. Specifically, processor 38 applies temperature data 88 and VCF 80 to corrected pulse data 84 to add or subtract a selected number of pulses so as to generate corrected, compensated data 92. Preferably, processor 38 stores corrected, compensated data 92 in memory 36. As noted above, those of skill in the art will appreciate that processor 38 may perform the meter correction and temperature compensation functions in any order, and may perform one of these functions without performing the other. In an alternative embodiment, processor 38 first compensates raw pulse data 82 for temperature variations and then corrects the compensated pulse data for meter error.

In yet another embodiment, processor 38 sends a signal carrying temperature data 88 and corrected pulse data 84 to controller 16 over serial data line 32. Controller 16 then applies temperature data 88 and VCF 80 (which will have been stored in memory 20 during calibration) to corrected pulse data 84 to generate corrected, compensated data 92. In yet another embodiment, both processor 38 and controller 16 generate corrected, compensated data 92 and controller 16 compares its result with that of processor 38 to ensure tampering has not occurred, thus adding a further layer of security.

Again, as with the process of correcting the raw pulse data, either the processor 38 or the controller 16, or both, may use the corrected, compensated data 92 to generate the total volume of fuel dispensed: corrected, compensated volume 94. Preferably, processor 38 converts corrected, compensated pulse data 92 to a volumetric flow rate and then to corrected, compensated volume 94. In such embodiments, processor 38 then stores corrected, compensated volume 94 in memory 36. Processor 38 further transmits a signal carrying the corrected, compensated volume 94 to controller 16, which provides the data to a display for the customer. Alternatively, processor 38 communicates the corrected, compensated pulse data 92 to controller 16 over line 32. Controller 16 then likewise generates corrected, compensated volume 94 and provides it for display to a customer. Therefore, it can be seen that this embodiment of pulser 24 eliminates the necessity for multiple temperature compensation circuit boards that communicate via an intrinsically safe connection.

Those of skill in the art will also appreciate that many different types of encrypted and unencrypted communications are possible between controller 16 and pulser electronics 28. For example, it is preferred in many embodiments that (following installation of pulser 24 into dispenser 12), every signal communicated between pulser 24 and controller 16, whether encrypted or unencrypted, include communications ID 74. This allows controller 16 to compare the communications ID sent from pulser 24 with the communications ID that controller 16 generated upon installation to verify that pulser 24 has not been tampered with or replaced. If the communications IDs do not match, controller 16 may generate an alarm or the like, disable pulser 24, notify appropriate authorities via communication link 46, or take other appropriate action to prevent fraud. The unique communications ID 74 also allows controller 16 to identify and send communications to a specific pulser among a plurality of pulsers in a fuel dispenser.

Controller 16 (or another remote device connected to controller 16 as desired) may preferably be adapted to "poll" pulser 24. As noted above, controller 16 may always read from memory 36, so controller 16 may be configured to request information from pulser 24 based on a configurable time frame. For example, in a preferred embodiment, controller 16 may be set to request the raw pulse data 82, corrected pulse data 84, corrected volume 86, temperature data 88, corrected, compensated data 92, and/or corrected, compensated volume 94 every 400 μs (or other selected time interval). Many different polling modes are contemplated, such as an error polling mode where controller 16 requests any errors generated by pulser 24.

Pulser 24 may also be configured to transmit automatic status updates to controller 16 (or another remote device in electronic communication with controller 16) as desired. For example, pulser 24 may send automatic status updates at predetermined intervals during an individual fueling transaction, at the end of a work shift, or after another selected time period.

Furthermore, some fuel dispensers, such as those that may be found in Europe, may have as many as or more than twelve (12) pulsers. Thus, it would be desirable for controller 16 to be able to reduce power consumption by enabling or disabling an individual pulser 24 as needed or desired. In this regard, controller 16 may be adapted to transmit a signal to pulser 24 instructing pulser 24 to disable, clear various stored data, and/or enter a low current mode. In such embodiments, controller 16 is able to control the power used by dispenser 12 so as to save energy. In a like manner, when pulser 24 is needed to operate during a fueling transaction, controller 16 may be adapted to send a signal to initialize pulser 24 and instruct it to enter normal operating mode.

Other security features of serial pulser 24 are also contemplated. For example, it is desirable to protect the contents of pulser electronics 28, in particular the contents of nonvolatile memory 36, from unauthorized access or tampering. Although storing and transmitting data in encrypted format provides security against electronic interrogation, there are ways to physically tamper with integrated circuits and memory devices.

In this regard, in one embodiment pulser 24 may comprise a conductive mesh screening internal to the pulser's housing 144 that provides a deterrent against physical tampering. Alternatively, the mesh screening may be attached to the location through which the pulser may be reached. Typically, mesh screening comprises a circuit of closely-spaced conductive lines substantially enclosing sensitive electronics components. Suitable electronics continuously monitor electrical characteristics of each conductive line for changes that may be indicative of tampering. If the electronics detect a change that indicates tampering is occurring or has occurred, sensitive data stored in a memory device may be erased or other corrective action can be taken.

Therefore, pulser 24 may preferably be enclosed within a security mesh and pulser electronics 28 may monitor electrical characteristics (e.g., resistance or voltage across a conductive line) of the security mesh. When tampering is detected, pulser electronics 28 is preferably adapted to erase the data stored in memory 36 by any suitable method. Further, pulser electronics 28 may also render memory 36 unusable or otherwise disable use of pulser 24 to prevent fraud. The fuel dispenser may then be inoperable until the pulser 24 is repaired or reset.

In another embodiment, the serial pulser may be in remote electronic communication with one or more components associated with a fuel dispenser to discourage fraud by replacement or removal of or tampering with the pulser. In this regard, a remote communications device, such as a transponder, is operative to communicate with communications electronics, such as interrogator electronics, associated with a processor, host, point-of-sale, or the like. The remote communications device may include traditional receiver and transmitter alone or in combination as well as traditional transponder electronics adapted to respond and/or modify an original signal to provide a responsive signal. Although a preferred communications method includes radio frequencies in the microwave range, these communications may include other RF, infrared, or other known remote communications methods. A transponder may provide either unidirectional or bidirectional communications with the communications electronics associated with an interrogator, and may be active or passive. Active transponders contain an independent energy source while passive transponders use a signal from the interrogator to provide energy and activate the response circuitry. Likewise, an interrogator will generally include a transmitter and a receiver operative to communicate with a transponder as defined above.

In this regard, FIG. 7 illustrates a pulser 100 comprising transponder electronics 102 and a flow meter 104 comprising interrogator electronics 106 according to one embodiment of the present invention. Transponder electronics 102 is adapted to provide wireless communications with interrogator electronics 106, and includes a transmitter 108 and a receiver 110 having associated antennas 112, 114. For example, transponder electronics 102 may be in the form of an RF integrated circuit chip. The transmitter 108 and receiver 110 operate to transmit data from and receive data into the transponder 102. The antennas 112, 114 may be any type of suitable antenna, including but not limited to a pole or slot antenna. Transponder electronics 102 may also include a battery (not shown). Additionally, transponder 102 may operate with only one antenna. Pulser 100 also comprises pulser electronics 116, which function as described above, in electronic communication with transponder electronics 102. In this regard, pulser electronics 116 includes processor 118, memory 120, and switch 122 similar to processor 38, memory 36 and switch 40. Preferably, processor 118 also includes software necessary to operate the transponder electronics 102. Pulser 100 is associated with pickoff 124 in a conventional fashion.

Transponder electronics 102 is operative to receive wireless communications signals (preferably modulated RF signals) through the antennas 112, 114 and processing these signals into information passed to processor 118. Transponder electronics 102 may also comprise other well known elements to enable communications, including but not limited to a clock and control electronics. Further, memory 120 may store information to be communicated to interrogator electronics 106, such as a serial number or communications ID.

Interrogator electronics 106 associated with flow meter 104 preferably comprises transmitter 126 and receiver 128 with associated antennas 130, 132. Transmitter 126 and receiver 128 operate to transmit data to and receive data from transponder electronics 102. Interrogator electronics 106 may also include various communications electronics. For example, such communications electronics may comprise a communications controller associated with a memory having the software necessary to operate the interrogator electronics 106 and communicate with a remote control system, such as the controller 16 described above. Flow meter 104 may also comprise wells 136, 138 (similar to wells 42, 44 described above).

Therefore, according to one aspect of the present invention, pulser 100 may be adapted to continuously or periodically communicate with meter 104 to ensure that pulser 100 has not been fraudulently replaced. For example, transponder electronics 102 may periodically send an RF signal to interrogator electronics 106, or interrogator electronics 106 may periodically send an RF signal to transponder electronics 102. Regardless, if interrogator electronics 106 receives a signal in response that does not contain expected information (or if interrogator electronics 106 does not receive a signal at all), interrogator electronics 106 may send a signal to a remote system (e.g., controller 16) to indicate fraud. The remote system may then sound an alarm or take other appropriate action to prevent a fueling transaction. It should be understood that pulser 100 may be adapted to remotely communicate with other components associated with the fuel dispenser in a manner similar to that described above.

It can thus bee seen that the present invention provides a novel pulser arrangement for use in a fuel dispenser. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. An apparatus for generating a measure of fluid, comprising:
   a flow meter;
   a pulser having a memory including correction data stored therein, said pulser associated with said flow meter for generating pulser data indicative of a volume of fluid delivered through said flow meter;
   a switch operatively connected to said memory, said switch actuatable by a technician to vary said memory of said pulser between a write-protected and a write-enabled mode, wherein new correction data may be written to said memory in said write-enabled mode; and
   a controller communicatively coupled to said pulser via a serial communication circuit.

2. The apparatus of claim 1, wherein said controller reads said correction data from said pulser memory and stores said correction data in a controller memory.

3. The apparatus of claim 2, wherein said correction data comprises flow meter calibration data.

4. The apparatus of claim 2, wherein said flow meter further comprises at least one temperature probe.

5. The apparatus of claim 4, wherein said correction data further comprises temperature volume correction data.

6. The apparatus of claim 1, wherein said pulser is adapted to produced altered pulser data using said correction data and transmit said altered pulser data to said controller.

7. The apparatus of claim 6, wherein said pulser also transmits said pulser data to said controller.

8. The apparatus of claim 2, wherein said controller is operative to read said correction data and uses said correction data to alter said pulser data.

9. The apparatus of claim 1, wherein said memory is nonvolatile memory.

10. The apparatus of claim 1, wherein communication between said pulser and said controller is encrypted.

11. The apparatus of claim 10, wherein said pulser is adapted to receive encryption algorithms into said memory in said write-enabled mode.

12. The apparatus of claim 10, wherein communication from said pulser includes an identifier known to said controller so as to verify said pulser.

13. The apparatus of claim 1, wherein said controller writes said new correction data to said memory of said pulser in an encrypted format.

14. The apparatus of claim 1, wherein said controller is further adapted to request information from said pulser at selected times.

15. The apparatus of claim 1, wherein said pulser is adapted to automatically transmit information to said controller at selected times.

16. The apparatus of claim 1, wherein a conductive security mesh is mounted in association with said pulser.

17. The apparatus of claim 1, comprising wireless transponder electronics coupled to said pulser and wireless interrogator electronics coupled to said flow meter.

18. A fuel dispenser, comprising:
   at least one flow meter;
   at least one pulser associated with said at least one flow meter for generating a pulse series indicative of a volume of fuel delivered through said at least one flow meter;
   said at least one pulser having an identifier, correction data and encryption information stored in nonvolatile memory;
   a control system for controlling the fuel dispenser, said control system being adapted to read from and write to said at least one pulser nonvolatile memory; and
   a communication circuit to enable communication between said control system and said at least one pulser, wherein said communication between said control system and said at least one pulser is encrypted;

wherein at least one of said at least one pulser and said control system is adapted to alter said pulse series using said correction data.

19. The fuel dispenser of claim 18, comprising a plurality of flow meters each having a respective one of a plurality of pulsers associated therewith.

20. The fuel dispenser of claim 19, wherein each of said plurality of pulsers is in direct electronic communication with said control system.

21. The fuel dispenser of claim 19, wherein a first pulser of said plurality of pulsers is in direct electronic communication with said control system.

22. The fuel dispenser of claim 21, wherein a remainder of said plurality of pulsers indirectly communicate with said control system via serial data lines connected to said first pulser.

23. The fuel dispenser of claim 19, wherein each of said plurality of pulsers is in direct electronic communication with a pulser hub, said pulser hub being in direct electronic communication with said control system and facilitating serial communications between said plurality of pulsers and said control system.

24. The fuel dispenser of claim 18, wherein said at least one pulser and said control system each generate an altered pulse series which are then compared by said control system to verify said altered pulse series.

25. The fuel dispenser of claim 18, wherein said correction data includes at least one of calibration data and temperature volume correction data.

26. The fuel dispenser of claim 18, wherein said at least one pulser stores at least one of said pulse series, an altered pulse series, and a volumetric measure in said at least one pulser nonvolatile memory.

27. The fuel dispenser of claim 18, wherein communication from said at least one pulser includes said identifier which is known to said controller so as to verify said at least one pulser.

28. A serial pulser associated with a control circuit and a flow meter for generating pulser data related to the volume of fluid delivered through said flow meter, comprising:
   a nonvolatile memory;
   a switch operatively connected to said nonvolatile memory, said switch actuatable by a technician to vary said nonvolatile memory of said serial pulser between a write-protected and a write-enabled mode;
   calibration data stored in said nonvolatile memory to enable said serial pulser to generate calibrated pulser data, wherein at least one of said pulser data and said calibrated pulser data is stored in said nonvolatile memory;
   encryption algorithms stored in said nonvolatile memory to facilitate secure communications between said serial pulser and said control circuit; and
   a serial communication circuit which enables serial communication between said serial pulser and said control circuit.

29. A fuel dispenser, comprising:
   a housing comprising fuel dispenser electronics;
   a fuel flow line and at least one flow meter operatively connected to said fuel flow line;
   at least one pulser associated with said at least one flow meter adapted to generate pulser data indicative of a volume of fluid delivered through said at least one flow meter; and
   a serial communication circuit to enable serial communication between said fuel dispenser electronics and said at least one pulser;
   wherein said at least one pulser comprises:
      a nonvolatile memory having an identifier stored therein;
      a switch operatively connected to said nonvolatile memory, said switch operative to vary said memory of said at least one pulser between a write-protected and a write-enabled mode;
      calibration data stored in said nonvolatile memory to enable said at least one pulser to generate calibrated pulser data, wherein at least one of said pulser data and said calibrated pulser data is stored in said nonvolatile memory; and
      an encryption algorithm stored in said nonvolatile memory to facilitate secure communications between said at least one pulser and said fuel dispenser electronics.

* * * * *